United States Patent [19]
Allart et al.
[11] 4,343,652
[45] Aug. 10, 1982

[54] CHROMOGEN SOLUTIONS FOR PRESSURE-SENSITIVE MARK-RECORDING SYSTEMS

[75] Inventors: Pierre J. Allart, Brussels; Claude A. Guillaume, Jodoigne, both of Belgium

[73] Assignee: Monsanto Europe S.A., Brussels, Belgium

[21] Appl. No.: 179,415

[22] Filed: Aug. 18, 1980

[30] Foreign Application Priority Data

Aug. 24, 1979 [GB] United Kingdom ................. 7929566

[51] Int. Cl.³ ........................ B41M 5/16; B41M 5/22; C09D 11/00

[52] U.S. Cl. .......................................... 106/21; 8/582; 8/583; 252/316; 282/27.5; 427/151; 428/320.4; 428/320.6; 428/320.8; 428/537

[58] Field of Search .................. 106/21; 252/316, 364; 8/582, 583; 282/27.5; 427/150, 151; 428/307, 323, 411, 537, 913, 914, 320.4, 320.6, 320.8

[56] References Cited

U.S. PATENT DOCUMENTS

| | | | |
|---|---|---|---|
| 3,836,383 | 9/1974 | Kiritani et al. | 252/316 |
| 3,846,331 | 11/1974 | Konish et al. | 8/526 |
| 3,979,327 | 9/1976 | Herber | 252/316 |
| 4,070,303 | 1/1978 | Ohkubo et al. | 252/316 |
| 4,093,278 | 6/1978 | Sears | 282/27.5 |
| 4,191,403 | 3/1980 | Dessauer et al. | 252/316 |

*Primary Examiner*—Bruce H. Hess
*Attorney, Agent, or Firm*—Henry Croskell; William H. Duffey; Stanley M. Tarter

[57] ABSTRACT

Pressure-sensitive mark-recording systems of chromogens comprised of diphenylmethane derivatives in solution with selected diester solvents is disclosed as well as pressure-sensitive mark-recording systems comprised of (a) sheet material, (b) mark-forming components supported by the sheet material and arranged in juxtaposition but in unreactive condition, a chromogen, and an acid clay sensitizer for the chromogen, and (c) the solvent supported by the sheet material but separated from the sensitizing agent by a physical barrier which is rupturable on the application of a marking instrument to the sheet material.

4 Claims, No Drawings

CHROMOGEN SOLUTIONS FOR PRESSURE-SENSITIVE MARK-RECORDING SYSTEMS

This invention relates to solutions which are useful in the production of pressure-sensitive mark-recording systems, and to such systems.

The most familiar form of pressure-sensitive mark-recording system is the so-called carbonless copying paper, which comprises a two-sheet system in which the under surface of the top sheet has a coating of microcapsules of a solution of a colourless chromogen, while the upper surface of the lower (receiver) sheet has an absorbent coating including a sensitizing agent for the chromogen. When a marking instrument is applied to the top sheet, the microcapsules are locally ruptured, thereby releasing the chromogen solution from the affected microcapsules to react with the underlying sensitizing agent and form coloured marks on the receiver sheet corresponding to the marks applied to the top sheet.

A successful carbonless copying paper system needs to meet a number of criteria. For example the marks on the receiver sheet should develop rapidly to a legible intensity of colour and a legible mark should persist for as long as the sheet is required to be kept. Whether the various criteria are met depends on a number of factors, including the nature of the chromogen, the solvent and the sensitizing agent, and many different materials of each category have been proposed. Chromogens which have been proposed include phthalide derivatives, for example crystal violet lactone and Malachite green lactone, indole-substituted pyromellitides, leucauramines, and diphenylmethane derivatives such as Michler's hydrol. Solvents which have been proposed include hydrocarbons, for instance petroleum fractions or synthetic hydrocarbons such as hydrogenated terphenyls, halogenated hydrocarbons, for instance chlorinated biphenyls, and esters, for instance alkyl phthalates. The sensitizing agent is usually an acid clay, for example an attapulgite or bentonite clay, or an acidic organic polymer, for example a phenol-aldehyde polymer or a partially or wholly hydrolysed styrene-maleic anhydride or ethylene-maleic anhydride polymer.

The chromogens which are probably most frequently referred to in the art are the phthalide derivatives, especially crystal violet lactone. These chromogens are usually used in solution in a hydrocarbon solvent. One reason for this choice of solvent is that although the phthalide chromogens are soluble in esters, for example, it is found that esters and certain other solvents having similar polarity to the esters, show too great a tendency to compete with the chromogen in affinity for the sensitizing agent, so that in some cases, no colour development occurs. This is especially so with certain acid clay sensitizing agents.

Certain chromogens that are diphenyl methane derivatives are less subject to this limitation and can be used in conjunction with solvents comprising esters, advantages of the latter over hydrocarbons being that the chromogens dissolve more readily and have higher solubilities. The use of diphenyl methane derivatives, for instance Michler's hydrol, as chromogens in pressure sensitive mark-recording systems is described in, for example, British Patent Specification No. 1,381,928 and U.S. Pat. No. 4,000,087.

The present invention concerns an improvement relating to the use in pressure-sensitive mark-recording systems, of chromogens that are diphenyl methane derivatives.

A solution of the invention is a solution of a chromogen which is a derivative of diphenylmethanol or diphenylmethylamine in a solvent comprising a diester having the formula $$ROOC(C_nH_{2n})COOR'$$

wherein R is a benzyl or alkylbenzyl group, and R' is an aliphatic or cycloaliphatic hydrocarbon group or a benzyl or alkylbenzyl group; and a pressure-sensitive mark-recording system of the invention comprises (a) sheet material, (b) mark-forming components supported by the sheet material and arranged in juxtaposition but in unreactive condition, the said components comprising a chromogen which is a derivative of diphenylmethanol or of diphenylmethylamine, and an acid clay sensitizer for the chromogen which produces a colour from the chromogen when brought into contact with the chromogen in the presence of a liquid solvent for the chromogen comprising a diester of the above formula and (c) the said solvent supported by the sheet material but separated from the sensitizing agent by a physical barrier which is rupturable on the application of a marking instrument to the sheet material.

Compared with the solvents, for example xylene or dibutyl phthalates, hitherto proposed for use in conjunction with chromogens that are diphenylmethane derivatives, use of solvents in accordance with the present invention results in an improvement in the resistance to fading of the marks on the receiver sheet during storage.

Alkylbenzyl groups from which R and R' may be selected are usually those wherein the alkyl substitution occurs in the benzene nucleus. Preferably the number of alkyl substituents does not exceed three, and preferably each such substituent contains up to three carbon atoms; more preferably, the total number of carbon atoms in the alkyl substituent or substituents does not exceed four. Examples of alkylbenzyl groups are 2-, 3-, and 4-methylbenzyl, 4-ethylbenzyl, 4-isopropylbenzyl and 2,4-dimethylbenzyl.

When R' is an aliphatic hydrocarbon group, it can, for example, be an alkyl or alkenyl group containing up to 18 carbon atoms, arranged in either a straight or branched chain. Preferred groups are those containing from 3 to 12 carbon atoms. Examples of alkyl groups from which R' may be selected are isopropyl, n-butyl, isobutyl, n-hexyl, isohexyl, n-octyl, 2-ethylhexyl, decyl, isodecyl, dodecyl, tetradecyl and hexadecyl, while allyl and 4-methylpent-2-enyl are examples of alkenyl groups.

When R' is a cycloaliphatic hydrocarbon group, it is generally a cycloalkyl or alkyl-substituted cycloalkyl group, for example cyclopentyl, cyclohexyl or a methylcyclohexyl group, although the corresponding cycloalkenyl groups are also contemplated.

The grouping $C_nH_{2n}$ is preferably a straight chain grouping, but it may be branched. Preferred esters are those where n has a value from 2 to 8, i.e. (where $C_nH_{2n}$ is a straight chain grouping) the succinates, glutarates, adipates, pimelates, suberates, azelates and sebacates.

Mixtures of esters can be used, and these may be mixtures of different esters of a single acid, for example an alkyl benzyl glutarate or alkyl benzyl adipate product where the source of the "alkyl" is a $C_6$–$C_9$ or a $C_8$–$C_{10}$ alkanol mixture; mixtures obtained by the esterification of mixtures of acids, for example a mixture of alkyl benzyl succinate, glutarate and adipate where the alkyl group is derived from a single alkanol; or mixtures of esters containing different alkyl groups and different acyl radicals.

Examples of individual diesters which can be used are benzyl isobutyl succinate, dibenzyl glutarate, benzyl isobutyl glutarate, benzyl 2-ethylhexylglutarate, benzyl isodecyl glutarate, 4-methylbenzyl isodecyl glutarate, dibenzyl adipate, allyl benzyl adipate, benzyl isopropyl adipate, benzyl isopentyl adipate, benzyl isodecyl adipate, benzyl cyclohexyl adipate, benzyl isobutyl pimelate and benzyl isodecyl suberate.

The solvents used in the present invention can contain more than one diester of the above formula, and may optionally contain other components. Such other components include dialkyl phthalates such as dibutyl phthalate and dioctyl phthalates, alkyl benzyl phthalates such as butyl benzyl phthalate, and various hydrocarbons, for example $C_6$–$C_{12}$ alkylbenzenes, kerosene or other petroleum fractions which are useful as diluents in certain circumstances to reduce the viscosity of the solvent. Preferably the solvent contains at least 50% by weight of a diester or of a mixture of diesters of the above formula. The proportions by weight of the diester and the diluent in mixtures may, for example, range from 50:50 to 90:10, for example 60:40, 70:30, 75:25 or 80:20. For rapid development of print intensity, the solvent is preferably one having a viscosity in the range 5 to 15 centistokes at 38° C.

Chromogens which are especially suitable for use in the present invention include Michler's hydrol, i.e. bis(p-dimethylaminophenyl)methanol, its ethers, for example the methyl ether of Michler's hydrol and the benzylether of Michler's hydrol, aromatic sulfonic and sulfinic esters of Michler's hydrol, for example the p-toluenesulfinate of Michler's hydrol, and derivatives of bis(p-dimethylaminophenyl)methylamine, for example N[bis(p-dimethylaminophenyl)methyl]morpholine.

Several encapsulation systems have been proposed for the encapsulation of the chromogen solution for use in carbonless copying paper, and the capsule walls in such systems generally may be formed from either natural or synthetic polymeric material. In the present invention, the capsule wall or shell is preferably made from a synthetic polymer, for example a polyurethane resin, a urea-formaldehyde resin, a melamine-formaldehyde resin or a polyamide resin. The use of such resins as shell-forming material in encapsulation is described in, for example, U.S. Pat. No. 3,016,308, British Pat. No. 989,264 and U.S. Pat. No. 3,429,827. Shells of this kind can be made significantly less permeable to the aliphatic benzyl phthalates used in the present invention than shells made of natural polymeric material such as gelatin.

The acid clay used as sensitizing agent for the chromogen in the present invention can be any of those conventionally used for this purpose, including bentonite and attapulgite. The naturally occurring clay may be subjected to various treatments such as acid extraction or calcination before use as the sensitizing agent.

The mark-recording system of the present invention can be prepared according to well known conventional procedures. Descriptions of methods for preparing both the dye-carrying paper and clay-coated receiving paper are to be found in the literature.

Although a preferred embodiment of this invention comprises a two-sheet system wherein the acid clay is carried by one sheet and a marking fluid comprising a chromogen and solvent is carried by a second sheet, the invention is not limited to such systems alone. The only essential requirement is that the chromogen and the acid clay be maintained in a separate or unreactive condition until pressure is applied to the system and that upon the application of pressure the chromogen and acid clay are brought into reactive contact. Thus it is possible to have the chromogen and acid clay present in a dry and unreactive state on a common carrier and to have the solvent alone carried on a separate sheet whereupon the application of pressure would release the solvent into the chromogen-acidic material mixture and promote localized reaction and colour development. Obviously, many other arrangements, configurations and relationships of the solvent and the mark forming materials with respect to their encapsulation and location on the supporting sheet or webs can be envisaged, and such arrangements are within the scope of the present invention. For example, it is possible to coat a single paper or support member with all the components of this system to form a single self-contained unit which can be marked by the movement of a stylus or other pressure-imparting means upon the surface of the paper. Such papers are particularly useful for use in inkless recording instruments.

Solutions of the invention were evaluated by the following technique.

A 0.5% by weight solution of Michler's hydrol p-toluene sulfinate in the solvent was prepared. To estimate print intensity, a plate engraved with a pattern of dots was coated with sufficient of the solution to give a coating 18 microns in thickness, using a doctor blade. A carriage-supported roller having a paper sheet coated with an acid clay sensitizing agent wrapped around the roller was then moved slowly across the solution-coated plate under constant pressure. Colour developed on the paper. The paper was removed from the roller, the intensity of colour was measured, using equipment described below, at 20 different points on the paper surface, and the values were averaged. After the initial reading, the paper was transferred to an air cabinet at 75° C. and 40% relative humidity. The paper was removed at intervals for further colour intensity measurements, average values being obtained as before.

The results given in Table 1 below were obtained with a Macbeth RD 514 reflectometer calibrated against a "perfect white" of 0.07 units of optical density and a "perfect black" of 1.78 units of optical density, using standard "perfect white" and "perfect black" plates supplied by the manufacturer. With this reflectomer, the higher the reading, the greater the intensity. The results given in Table 2 were obtained using a Neotec Tru-Color II Colorimeter to obtain the Y coordinate (brightness) value of the CIE colour, so that the numerical values presented are inversely related to colour intensity.

In Table 1, the performance of alkyl benzyl esters is compared with that of dibutyl phthalate, the intensity values shown being expressed on a linear scale on which the initial intensity obtained with dibutyl phthalate has the value 100. DBP is dibutyl phthalate, A is benzyl isobutyl succinate, B is benzyl isobutyl glutarate and C is benzyl isodecyl glutarate.

In Table 2, the performance of a solvent (E) which is a mixture of an ester component according to the invention and a diluent in the proportions by weight 7:3 is compared with that of a solvent (D) which is a mixture of dibutyl phthalate and the same diluent in the same proportions. The ester component according to the invention used to obtain these results was a mixture of dibenzyl succinate, dibenzyl glutarate and dibenzyl adipate, and the diluent was a ($C_{8-10}$ alkyl)benzene.

TABLE 1

| | Ester | | | |
|---|---|---|---|---|
| Time (hours) | DBP | A | B | C |
| 0 | 100 | 95 | 109 | 118 |
| 12 | 59 | 65 | 78 | 105 |
| 24 | 50 | 61 | 79 | 98 |
| 48 | 36 | 66 | 69 | 86 |

TABLE 2

| | Solvent | |
|---|---|---|
| Time (hours) | D | E |
| 0 | 12.9 | 12.8 |
| 4 | 12.9 | 12.8 |
| 24 | 17.2 | 12.7 |
| 30 | 17.6 | 12.4 |

TABLE 2-continued

| | Solvent | |
|---|---|---|
| Time (hours) | D | E |
| 48 | 19.6 | 13.4 |

The improved results obtainable by the use of esters in accordance with the present invention are apparent.

We claim:

1. A solution for use in a pressure-sensitive mark-recording system comprising:

a. a chromogen that is a derivative of diphenylmethanol or diphenylmethylamine; and b. a diester solvent having the formula $$ROOC(C_nH_{2n})COOR'$$

wherein R is a benzyl or alkylbenzyl group, R' is an aliphatic or cycloaliphatic hydrocarbon group or a benzyl or alkylbenzyl group, and n has a value of from 1 to 10.

2. A solution according to claim 1 in which R is a benzyl group, $R^1$ is an alkyl group of from 3 to 12 carbon atoms or a benzyl group and n has a value of from 2 to 8.

3. A solution according to claim 2 wherein the diester is a succinate, glutarate or adipate.

4. A solution according to claims 1, 2, or 3 in which the solvent contains at least 50% by weight of the diester or of a mixture of such diesters.

* * * * *